United States Patent
Krampert (10) Patent No.: US 12,352,566 B2
(45) Date of Patent: Jul. 8, 2025

(54) SENSOR DEVICE FOR A TRACK GUIDE, ROLLING PATH INSERT, GUIDE CARRIAGE, GUIDE RAIL, AND TRACK GUIDE

(71) Applicant: Robert Bosch GmbH, Stuttgart (DE)

(72) Inventor: David Krampert, Hammelburg (DE)

(73) Assignee: Robert Bosch GmbH, Stuttgart (DE)

( * ) Notice: Subject to any disclaimer, the term of this patent is extended or adjusted under 35 U.S.C. 154(b) by 275 days.

(21) Appl. No.: 18/051,274

(22) Filed: Oct. 31, 2022

(65) Prior Publication Data

US 2023/0168074 A1 Jun. 1, 2023

(30) Foreign Application Priority Data

Nov. 29, 2021 (DE) ...................... 10 2021 213 385.1

(51) Int. Cl.
*G01B 7/16* (2006.01)
(52) U.S. Cl.
CPC ..................................... *G01B 7/16* (2013.01)
(58) Field of Classification Search
CPC ....................................................... G01B 7/17
See application file for complete search history.

(56) References Cited

U.S. PATENT DOCUMENTS 10,520,023 B2 * 12/2019 Ziegler ................ F16C 29/065
2017/0356817 A1 * 12/2017 Bluemm ............... G01L 5/0019

FOREIGN PATENT DOCUMENTS

| DE | 102 53 178 B4 | 3/2004 |
| DE | 102 43 095 B4 | 7/2004 |
| DE | 10 2016 210 109 A1 | 12/2017 |
| DE | 10 2019 200 780 A1 | 7/2020 |
| EP | 2 110 571 B1 | 5/2015 |

OTHER PUBLICATIONS

Krampert et. al; "Load Measurement in Linear Guides for Machine Tools", Sensors, 19, 3411, Aug. 3, 2019, MDPI, Basel, Switzerland.

* cited by examiner

*Primary Examiner* — Kristina M Deherrera
*Assistant Examiner* — Jean F Morello
(74) *Attorney, Agent, or Firm* — Maginot, Moore & Beck LLP (57) ABSTRACT

A sensor device for a rolling path insert of a track guide can be loaded by rolling bodies and is pressure-sensitive. The sensor device includes at least one tuple, extending in a rolling direction, of a number of sensors, which can each be signal-connected or are signal-connected to an evaluation device, by means of which a relevant difference signal can be determined from sensor signals of sensor pairs of the at least one tuple. The sensor device can be included in a rolling path insert, a guide carriage and a guide rail for a track guide, and a track guide.

17 Claims, 6 Drawing Sheets

SENSOR DEVICE FOR A TRACK GUIDE, ROLLING PATH INSERT, GUIDE CARRIAGE, GUIDE RAIL, AND TRACK GUIDE

This application claims priority under 35 U.S.C. § 119 to application no. DE 10 2021 213 385.1, filed on Nov. 29, 2021 in Germany, the disclosure of which is incorporated herein by reference in its entirety.

The disclosure relates to a sensor device, a rolling path insert, a guide carriage or a guide rail, and a track guide.

BACKGROUND

A track guide, in particular a linear guide, enables a translatory, guided movement. For this purpose, the track guide has a usually stationary guide rail or a stationary guide profile on which a guide carriage is guided on rolling bodies.

A guide carriage for a linear rolling bearing or a linear guide that has a sensory layer arranged on a raceway insert is known from the document DE 10 2016 210 109 A1 from the applicant. Loads on the guide carriage can be measured via the sensory layer. The structure is such that two meandering piezo-resistive thin-film sensors spaced apart in the rolling direction are arranged on each of the steel inserts of the rolling bearing. Nickel-containing, diamond-like hydrocarbons (Ni-DLC) or doped silicon are proposed as materials in this case. Piezo-resistive materials have the advantage of high elongation sensitivity, so that an extension of the sensor in the measuring direction can be correspondingly short.

The DLC sensor layer used has a high temperature sensitivity, which is discussed, for example, in the document DE 102 53 178 B4. This temperature influence, which is effective in the sense of a disturbance variable, must be compensated for in order to obtain meaningful measurements. Furthermore, this type of sensor layer is not only sensitive to the force introduced into the raceway via the rolling bodies, but also to any deformation of the guide carriage or the raceway insert. The deformation of the guide carriage and further unknown influences thus potentially contribute to measuring inaccuracies. These also have to be compensated for in a complex manner.

Document DE 102 43 095 B4 shows a rolling bearing having an integrated piezo-resistive sensor system. In this case, a piezo-resistive intermediate layer is integrated between bearing shell portions and is contacted in a punctiform manner by electrodes. The cross section of the electrode establishes the local measurement cross section of the relevant piezo-resistive sensor element. By spacing apart the electrodes along the rolling path, the load rolling path can be measured at several points.

At least to compensate for the mentioned temperature influence as a disturbance variable, solutions are known from the prior art in which a sensor which is non-loadable by rolling bodies is placed outside the rolling path as a reference, so that the temperature influence can be calculated by said sensor.

The grouping of the sensors in tuples is described in the document DE 10 2019 200 780 A1, which is attributed to the applicant. In this case, a relevant signal difference is determined and evaluated from signals of adjacent sensors of the tuple, which enables the compensation of disturbance variables which have a similar or the same influence on the two sensors without having to provide the sensor placed outside the rolling path to do so. The problem here is that the requirements for the signal quality and for the compensation oppose one another. In the optimization of a layout, there is therefore a discrepancy between the best possible compensation of disturbance variables and the best possible sensitivity to the variables to be measured, which are directly dependent on the rolling body load. For the best possible disturbance variable compensation, the sensors would have to lie as close as possible to one another; for the best possible sensitivity to the variable to be measured, a certain distance is optimal. In addition, for an optimal evaluation of the sensors as tuples, it is important that the position of the sensors relative to one another in the group is optimized, since an optimization only in pairs is limited.

SUMMARY

In contrast, the objects of the present disclosure are to provide a sensor device for a track guide which is optimized with respect to its signal quality of the variables to be measured and with respect to its disturbance variable compensation. In addition, the object of the disclosure is to provide a rolling path insert, a guide carriage or a guide rail having an optimized signal quality and disturbance variable compensation. Lastly, the object is to provide a track guide having an optimized signal quality and disturbance variable compensation.

The first object is achieved by a sensor device having the features described herein, the second by a rolling path insert having the features described below, and a guide carriage and a guide rail having the features set forth in detail below. The third object is achieved by a track guide having the features disclosed herein.

A sensor device is provided for a carriage rolling path or rail rolling path of a track guide and is loadable by rolling bodies and pressure-sensitive. The sensor device has at least one tuple which extends in the track direction or in the rolling direction and comprises a number of sensors, each of which can be signal-connected or is signal-connected to an evaluation device. The sensors are configured in particular for the local measurement of elongations which result from a load of a guide carriage of the track guide, wherein the load can be supported, in particular is supported, by the rolling bodies on the carriage rolling path and/or rail rolling path. The rolling direction is preferably a longitudinal direction or extension direction of the sensor device. The evaluation device is preferably part of the sensor device. An evaluation of the sensor signals is provided via the evaluation device in such a way that it determines a relevant difference signal from the sensor signals of sensor pairs of the at least one tuple. Preferably, the tuple is configured in such a way that, at least when the relevant sensor pair is loaded eccentrically in the rolling direction by one of the rolling bodies, disturbance variable-dependent components of the sensor signals of the sensor pair are the same, in particular almost the same, and load-dependent components are different, in particular clearly different. In order to achieve this goal, according to the disclosure, at least two of the sensor pairs are configured and/or arranged so as to overlap with respect to the rolling direction. In other words, at least two of the sensor pairs are nested in the track direction or rolling direction or at least one sensor pair is enclosed by the other at least in portions in this direction.

Based on a defined extension of the tuple and the number of sensors, the relevant sensor pair forming the difference signal thus has, according to the disclosure, a greater extension in the track direction or rolling direction than is possible in the case of a purely sequential configuration or arrangement of the sensors and sensor pairs according to the prior art. Due to the greater distance between the sensors in the sensor pairs, the difference signal resulting in each case is stronger and the signal quality of the variables to be measured, for example a load, is improved. The overlap or nesting furthermore leads, at least in portions, to a comparatively small distance between sensors or sensor portions, which benefits the compensation of the disturbance variables. With the overlap of the sensor pairs according to the disclosure, the position of the sensors in relation to one another in the tuple is optimized and not only in the sensor pair, as in the prior art. An optimum of signal quality and disturbance variable compensation results.

In one development, the overlap or nesting of the sensor pairs is stored in the evaluation unit as an algorithm for forming the difference signals. This can be realized in the form of hardware or software.

The evaluation unit is preferably configured in such a way that the determination of the difference signals and the determination of the load is carried out according to the method of the document DE 10 2019 200 780 A1, which is attributed to the applicant. A detailed description of the method can therefore be dispensed with at this point and reference is made to the cited document for the purpose of the disclosure.

Elongations of the sensors which arise when the rolling path is loaded by the rolling bodies can be calculated, for example, according to "Load Measurement in Linear Guides for Machine Tools" (D. Krampert, S. Unsleber, C. Janssen and L. Reindl, 2019). The sensor signals then result from integrating the elongations. The sensor signals are preferably ideally proportional to the acting load, and therefore can be considered generally valid and normalized in a position-dependent manner for only one load and used to optimize the arrangement of the sensor pairs.

A further or a plurality of further tuples of the sensor device can be designed or developed in a manner identical to or different from the at least one tuple.

In one development, a relevant extension of the sensor pairs of the at least one tuple relative to the rolling direction is greater than an extension of the at least one tuple in this direction divided by a number of sensor pairs.

The developments described below always refer to the previously mentioned at least one tuple. Where it is possible, this is shortened to "the tuple" or is not mentioned in the following for linguistic simplicity.

Depending on the version of the sensor device—with an undivided sensor or with a divided sensor, which is explained in more detail below—in one development the relevant extension of the sensor pairs lies in a range which encompasses a rolling body radius, so that the relevant extension is smaller, equal to or greater than the rolling body radius (undivided sensor). Alternatively, the range encompasses a rolling body diameter or a rolling distance (divided sensor).

In the case of cage-guided rolling bodies, the rolling distance is precisely predetermined. Without a cage, the rolling distance results, for example, due to the impact or abutment of the rolling bodies on or with one another, in particular with respect to the rolling body diameter. The rolling distance then corresponds to a distance of the point contacts or line contacts of two adjacent rolling bodies on the rolling path upon impact or abutment.

In one development, the extension of the tuple is preferably equal to the rolling body diameter or rolling distance, in particular in the case of the undivided sensor, or is greater than this, in particular in the case of the divided sensor.

In one of the versions, at least one of the sensors of at least one of the sensor pairs is divided into sensor portions which are spaced apart from one another in the rolling direction, in particular by the rolling body diameter or rolling distance. The sensor portions are electrically connected in this case. In other words, one of the sensors of the sensor pair is formed by sensor portions spaced comparatively far apart, which are contacted together, in particular so as to be connected in parallel. Depending on the placement of the second sensor of the sensor pair relative to these sensor portions, the sensitivity to the disturbance variables can thus be set or optimized, in particular reduced, well.

In a preferred development, the sensor portions of the divided sensor are spaced apart from one another in the rolling direction by the rolling body diameter or rolling distance, or even farther.

The reduction in the sensitivity to the disturbance variables results in particular in a development in which the other of the sensors of the sensor pair configured with a divided sensor is arranged between the sensor portions of the divided sensor. In particular, the other of the sensors is spaced apart from each of the two sensor portions by the rolling radius or half the rolling distance.

In one development, the sensors and/or sensor portions are arranged along the tuple, in relation to the rolling direction, so as to be distributed equidistantly at least in portions. In other words, the distances between adjacent sensors and/or sensor portions are the same in the relevant portion of the tuple.

In one development, the arrangement of the sensor pairs in the tuple is such that the sensor pairs are formed continuously and alternately in and counter to the rolling direction.

In one development, in particular starting from a, relative to the rolling direction, first sensor or first sensor portion of a first sensor pair, the position of the second sensor of this sensor pair is located in the rolling direction. The position of the relevant other sensor portion of the divided sensor is explained in more detail below. The next, second sensor pair, which follows the first sensor pair, is then formed by the mentioned second sensor and a third sensor or sensor portion spaced apart counter to the rolling direction. The third sensor pair is in turn formed by this third sensor or sensor portion and a fourth sensor spaced apart in the rolling direction, and so on.

It should be mentioned here that the described pair formation can alternatively start counter to the rolling direction. By way of example, starting from a, relative to the rolling direction, last sensor or last sensor portion of a sensor pair, the position of its second sensor is then located counter to the rolling direction. The developments accordingly relate to both versions of the formation of sensor pairs with the start in or counter to the rolling direction.

In one development, the distance between the sensors or sensor portions is defined with an odd ordinal number or position number. According to the continuous pair formation described above, the odd ordinal number or position number is one, three or five and so on, and thus designates the first, third or fifth sensor or sensor portion in the rolling direction, or alternatively counter to the rolling direction. The relevant distance from the third to the first and from the fifth to the third sensor, and so on, is preferably within a value range around a quotient which is calculated as a function of the rolling body diameter or rolling distance and the number of sensor pairs of the tuple.

In one specific embodiment, this distance is, for example, equal to the quotient, according to $2*r/(n-1)$, with r the rolling body radius and n the number of sensors and thus n−1 the number of sensor pairs.

In one development, for the sensor pairs formed in the rolling direction—for example, for the sensor pair of the first and second sensors, third and fourth sensors or fifth and sixth sensors, and so on—the distance between the sensor or sensor portion having an even ordinal number or position number and the previously mentioned sensor or sensor portion having an odd ordinal number of this sensor pair is defined. This distance is in particular calculated as a sum of a rolling body radius and a quotient, wherein the quotient is defined as a function of the rolling body radius and the number of sensor pairs.

In one specific embodiment, this distance is, for example, equal to the sum $r+r/(n-1)$, with r the rolling body radius and n the number of sensors and thus n−1 the number of sensor pairs.

In one development, for the sensor pairs formed counter to the rolling direction—for example, for the sensor pair of the second and third sensors, as well as the fourth and fifth sensors, and so on—the distance between the sensor or sensor portion having an odd ordinal number or position number and the previously mentioned sensor or sensor portion having an even ordinal number of the aforementioned sensor pair formed in the rolling direction is defined. This distance is calculated in particular as a difference between the rolling body radius and the last-mentioned quotient.

In one specific embodiment, this distance is, for example, equal to the difference $r-r/(n-1)$, with r the rolling body radius and n the number of sensors and thus n−1 the number of sensor pairs.

In one development, a width of the sensors or sensor portions transverse to the track direction or rolling direction of at least one of the tuples is reduced, so that conduction paths or contact paths of at least one other of the tuples are guided laterally past this tuple.

In one development, an extension of the sensors or sensor portions in or parallel to the track direction or rolling direction is minimized. The influence of this extension is such that an amplitude of the difference signal increases when this extension is minimized. A lower limit of this extension is thereby defined by a coating process, by means of which the sensors are manufactured.

In one development, a width of the sensors or sensor portions transverse to the track direction or rolling direction is the same along the relevant tuple, wherein the width of at least two tuples is different.

In one development, this width decreases or increases or alternates from tuple to tuple.

Mixed forms of the three versions are of course possible.

A guide carriage or a guide rail, in each case as a component of a track guide, has at least one rolling path on which rolling bodies of the track guide that can be arranged between the guide carriage and the guide rail can roll. According to the disclosure, a sensor device according to at least one aspect of the preceding description is assigned to the rolling path.

A track guide according to the disclosure, in particular a linear guide, has an extending guide rail and a guide carriage which is mounted on rolling bearings thereon and is movable in the extension direction, wherein the guide rail and/or the guide carriage have at least one rail rolling path or carriage rolling path on which rolling bodies arranged between the two can be rolled. According to the disclosure, a sensor device according to at least one aspect of the preceding description is assigned to the rolling path.

The sensor device according to the disclosure can interact with cylindrical, conical roller-shaped or spherical rolling bodies. The device can be used with rolling bearings of any rolling body shape, insofar as sensors are used for the local measurement of elongations which arise when the rolling bodies are loaded. Examples are rotary rolling bearings, ball screws and ball bushings.

BRIEF DESCRIPTION OF THE DRAWINGS

Exemplary embodiments of the present disclosure are described below on the basis of the associated drawings. In the drawings.

DETAILED DESCRIPTION

Figure 1:
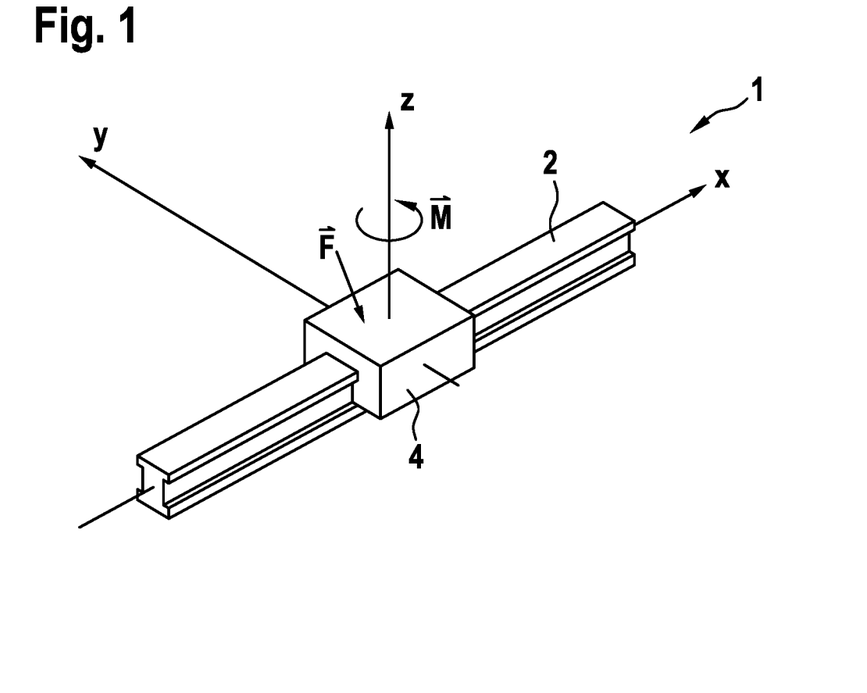
FIG. 1 shows a track guide having a guide rail and a guide carriage which is mounted on rolling bearings thereon, according to an exemplary embodiment.

According to FIG. 1, a track guide 1 has a guide rail 2 on which a guide carriage 4 is guided in a roller-mounted manner. An extension direction, and thus the guide direction and rolling direction, is denoted with x, a vertical axis of the guide carriage 4 is denoted with z and its transverse axis is denoted with y. The guide carriage 4 is guided in a linearly movable manner on the guide rail 2. A force F and a torque M are indicated by way of example as the load acting on the guide carriage 4. This load is to be determined by means of a sensor device and its evaluation device while compensating for disturbance variables.

Figure 2:
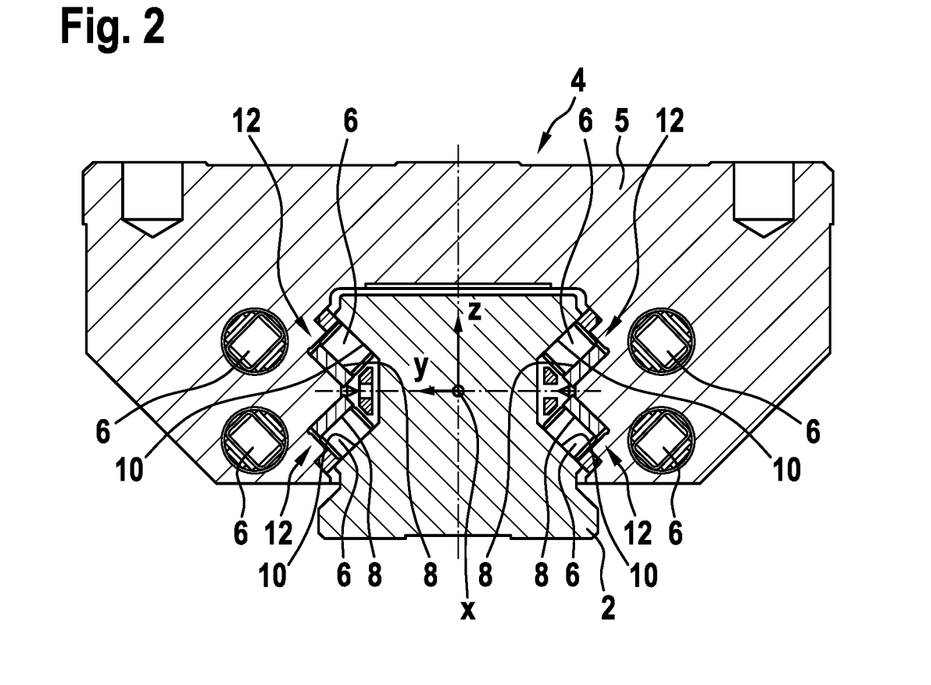
FIG. 2 shows the track guide according to FIG. 1 in a cross section.

FIG. 2 shows a section through a y-z plane of the track guide 1 according to FIG. 1. According to FIG. 2, the guide carriage 4 has four rows of endlessly circulating rolling bodies 6, which are roller-shaped in the exemplary embodiment. A different shape of the rolling bodies, for example a spherical shape, and also a different number of rows, are of course possible. On the guide carriage side, the rolling bodies 6 roll in a load-transmitting manner on a carriage rolling path 8; on the guide side or rail side, they roll in a load-transmitting manner on a rail rolling path 10. The guide rail 2 extends in the rolling direction x with a constant outer cross section. The guide rail preferably consists of steel and is hardened at least in the region of the rail raceways 10.

The relevant carriage rolling path 8 is formed by the surface of a rolling path insert 12 which faces the guide 2 and the back of which is glued to a main body 5 of the guide carriage 4. Alternatively, it is possible to arrange said path on the main body 5 in a force-locking/frictional and/or form-locking manner. The carriage rolling paths 8 can of course also be formed integrally with the main body 5. The track guide 1 is designed largely according to the teaching of the document EP 2 110 571 B1.

Figure 3:
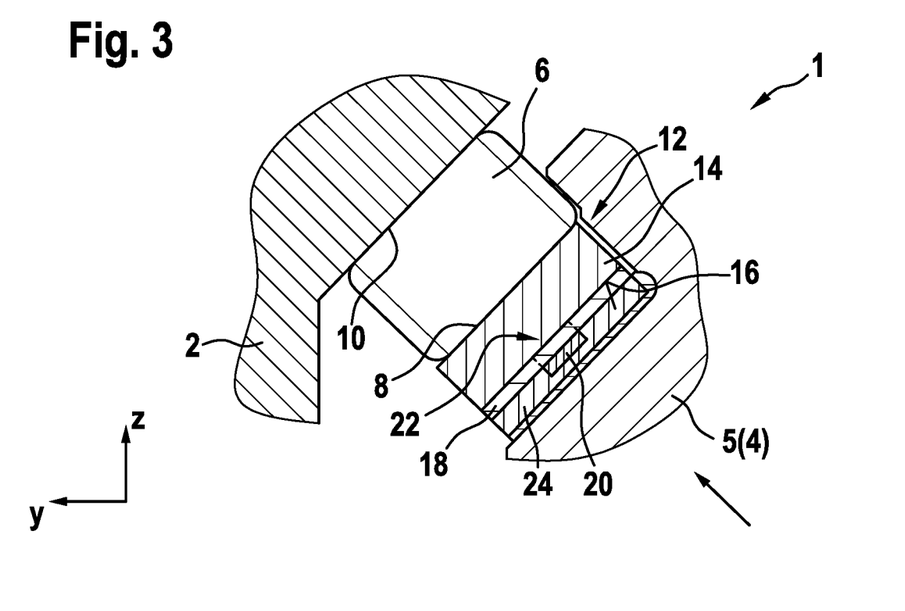
FIG. 3 shows a detail of the track guide according to FIG. 2 in the region of a rolling bearing.

FIG. 3 shows a detail of the cross section according to FIG. 2 in the region of the rolling bearing of the guide carriage 4 on the guide rail 2, that is to say in the region of the rolling bodies 6. A base body 14 of the rolling path insert 12 has a rear support surface 16. Said surface is coated with a piezo-resistive layer 18 consisting of amorphous hydrocarbon, in particular of DLC (diamond-like carbon). The thickness of the layer 18 is, for example, 6 μm, wherein it is shown in an exaggerated thickness in FIG. 2 for the sake of clarity. Electrodes 20 contact the layer 18. Each of the electrodes 20, in conjunction with the cross section of the piezo-resistive layer 18 (shown dashed) which is contacted thereby, thus forms a piezo-resistive sensor 22 of a sensor device of the track guide 1. The entire layer structure of the rolling path insert 12 is covered by an electrically insulating cover layer 24.

Figure 4:
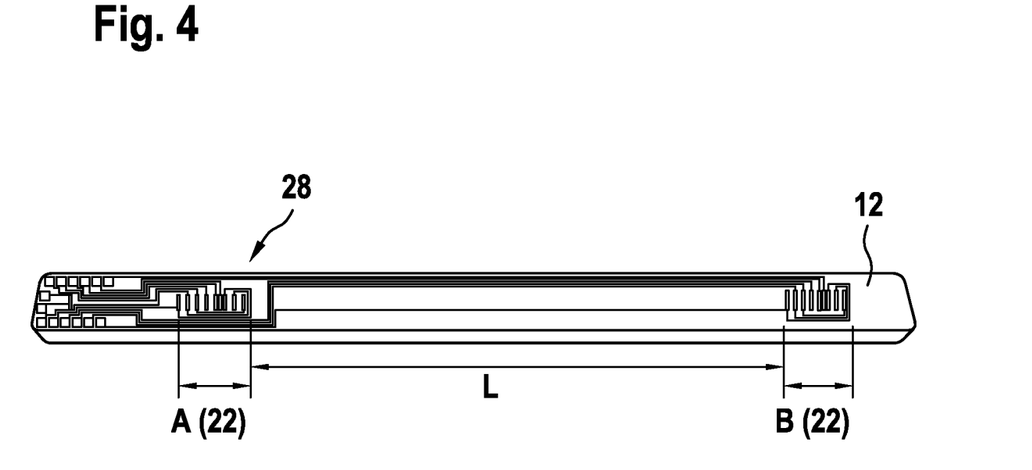
FIG. 4 shows a sensor device of the track guide according to the preceding figures, in a perspective view.

FIG. 4 shows the sensor device 28 with the arrangement of its sensors 22 along the rolling path insert 12 in a perspective view from below, that is to say, a rear side of the rolling path insert 12 relative to the rolling path 8 is shown, wherein the main body 5 and the cover layer 24 are not shown. In this case, the sensors 22 are combined into tuples A and B, which have a distance L from one another in the rolling direction x. The purpose of the arrangement in tuples is to determine the load on the rolling bodies 6 lying above them, irrespective of its unknown position. For this purpose, the information from the signals from a plurality of sensor pairs of the tuple A, B and their difference signals are evaluated together.

Figure 6:
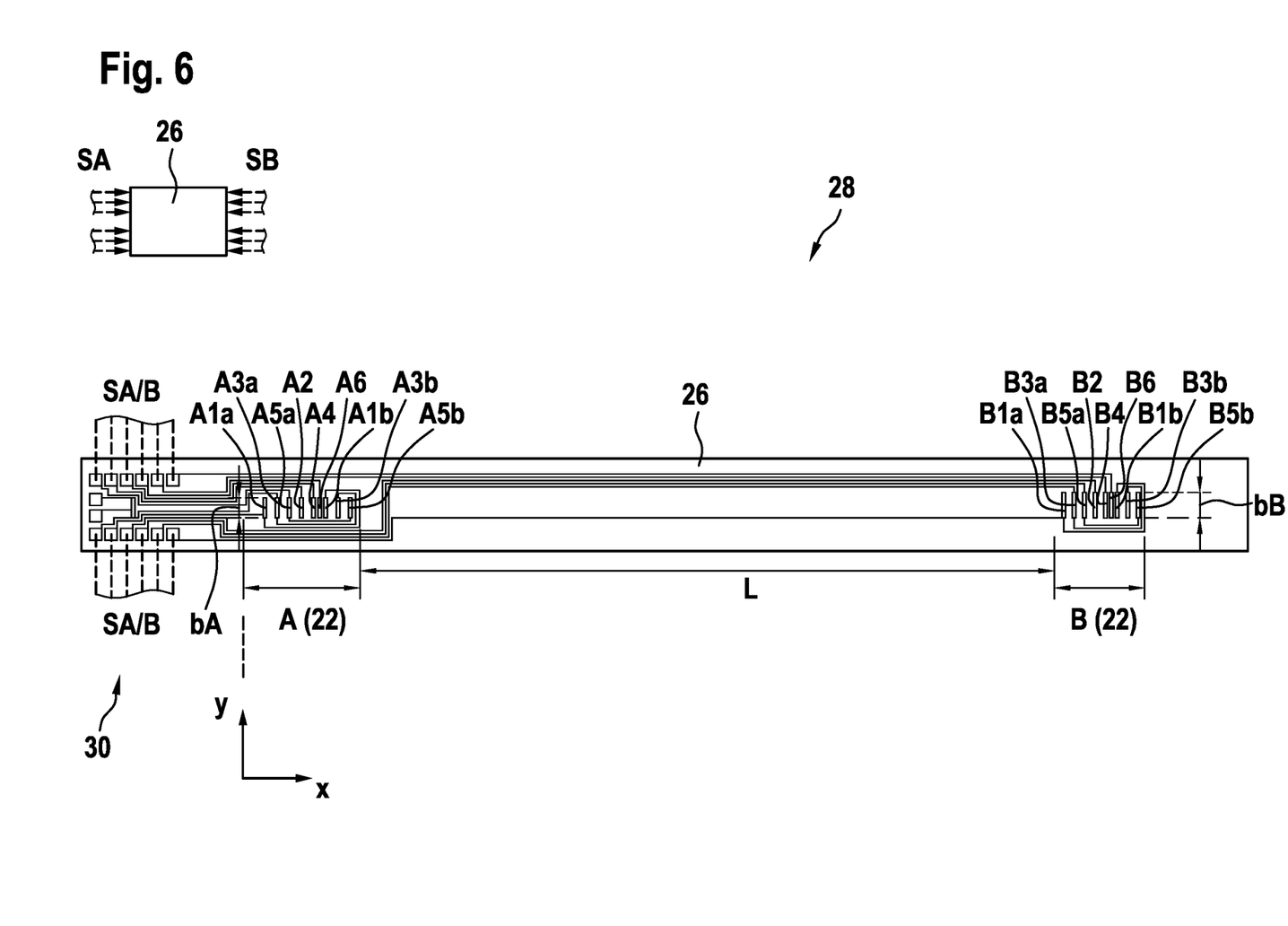
FIG. 6 shows the sensor device according to FIG. 4 with sensor tuples according to FIG. 5*d* and an evaluation device, in a plan view.

FIG. 6 shows the rear rolling path insert 12 according to FIG. 4 in a plan view. In addition, an evaluation device 26 of the sensor device 28 is shown, by means of which the above-mentioned load can be determined from the signals of the sensors 22. The sensors 22 of the tuples A, B are designated individually, starting with the tuple identifier A, B, followed by an ordinal number 1, 2, 3, 4, 5, 6 of a pair formation of the sensors 22, and in the case of divided or split sensors (A1, A3, A5) followed by a letter a, b which indicates whether it is a sensor portion positioned in the front (a) or rear (b) in the rolling direction x. In the rolling direction x, the sensors 22 in this case have the same sequence and the same distances x in both tuples A, B. In this direction, the sensors 22 of tuple A are A1a, A3a, A5a, A2, A4, A6, A1b, A3b A5b; those of tuple B are accordingly B1a, B3a, B5a, B2, B4, B6, B1b, B3b B5b. The only difference between the tuples A, B is their width bA, bB transverse to the rolling direction x. The sensors 22 of tuple A have a smaller width bA than those of tuple B.

Arranged on an end portion 30 of the rolling path insert 12 are signal contacts SA/B, which are signal-connected to inputs SA and SB of the evaluation device 26. The signal contacts SA make contact with the aforementioned sensors of tuple A, the signal contacts SB make contact with those of tuple B.

Figure 5A:
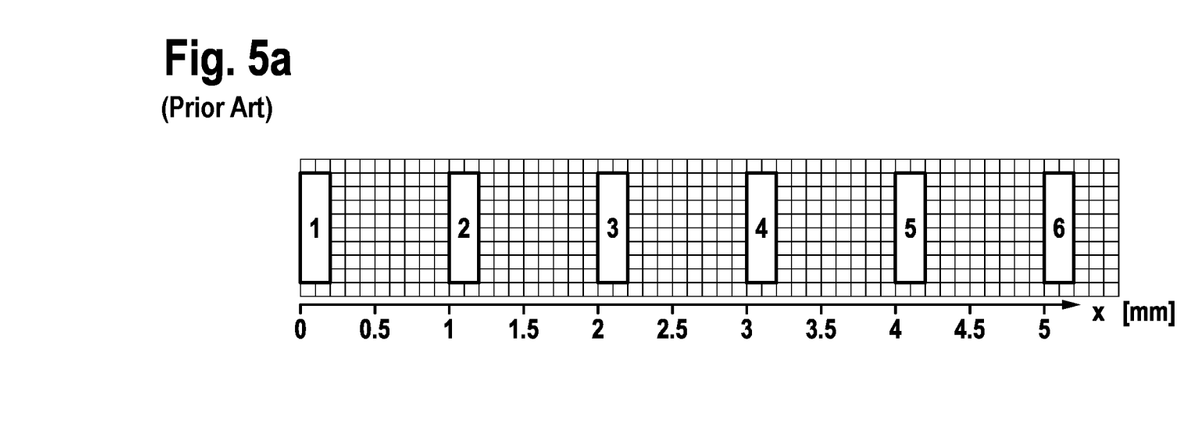
FIG. 5*a* shows a sensor tuple of a sensor device according to the prior art.
Figure 5B:
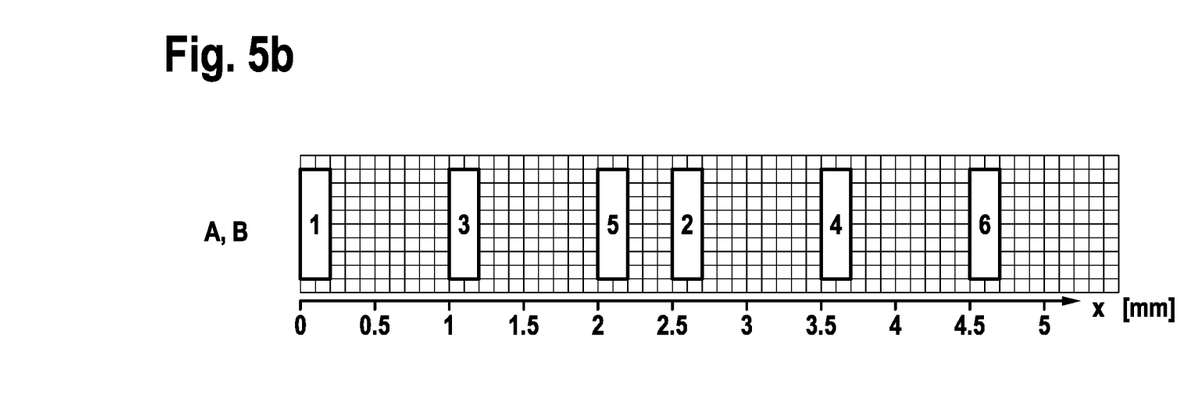
FIGS. 5*b*, 5*c*, and 5*d* show three exemplary embodiments of a sensor tuple of a sensor device according to the disclosure.
Figure 5C:
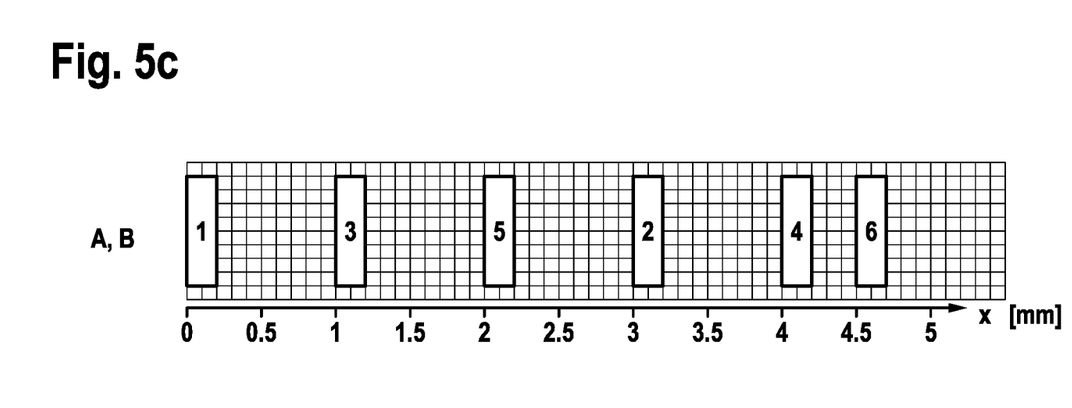
Figure 5D:
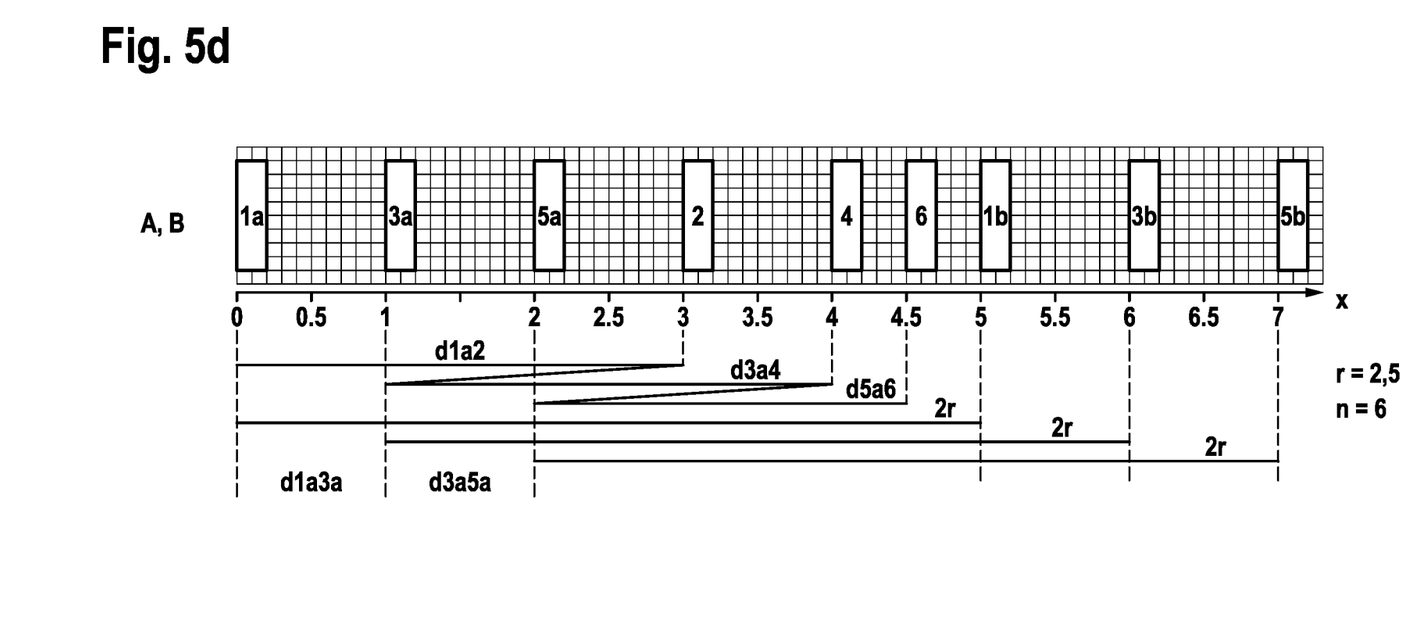

FIGS. 5b to 5d show the structure and arrangement according to the disclosure of the sensors 22 in the tuples A, B, wherein FIG. 5a shows the structure and arrangement of the sensors according to a prior art. In this case, the sensors are each numbered in a simplified manner with their ordinal number for pair formation. It is assumed that the rolling bodies 6 have a diameter of 5 mm and are not guided in a cage. Furthermore, it is assumed that rolling bodies 6 are substantially in contact with one another during operation. In this way, a distance of the point contacts or linear contacts of the rolling bodies 6 on the rolling path 8 is 5 mm, i.e., one rolling body diameter. A number n of the sensors is all four cases n=6.

According to FIG. 5a, the sensors 1 to 6 are arranged so as to be equally distributed in the tuple, wherein a distance d12, d23, d34, d45 and d56 of the sensor pairs A12, A23, A34, A45, A56 is likewise the same. The distances d are calculated by 2*r/(n−1), i.e., the rolling body diameter divided by the number of sensor pairs. As explained, these are continuously calculated from one sensor to the next in the downward direction x. The evaluation device 26 calculates a difference signal from sensor signals Ri of the sensors of the relevant sensor pair and evaluates them to determine the load, which is described in detail in the publication DE 10 2019 200 780 A1 from the applicant, such that further explanations of the evaluation can be dispensed with at this point. The advantage of the evaluation in pairs is the possibility of compensating for the disturbance variables. However, as already mentioned above, a distance between the sensors that is as large as possible, ideally the rolling distance of the rolling bodies 6, for maximizing the difference signal, and a distance that is as small as possible for improving the disturbance variable compensation are in competing opposition to each other.

It can be clearly seen in FIG. 5a that, in the case of conventional formation of the sensor pairs, the distance between the sensors of the sensor pairs A12, A23, A34, A45, A56 is significantly smaller (1 mm) than the rolling distance (5 mm or 2 r). This enables a uniform sensitivity of the tuple at each rolling body position. However, this does not maximize the amplitude of the individual sensor signals.

In contrast, as explained above, the object of the disclosure is the optimization of the sensor signals and disturbance variable compensation, which according to the disclosure leads to arrangements of the sensors according to FIGS. 5b to 5d. According to the disclosure, these exemplary embodiments have in common that the sensor pairs "overlap" in the rolling direction.

The exemplary embodiment according to FIG. 5b shows that the sensor pair A12, consisting of the sensors A1 and A2, enclose the sensors A3 and A5 with the sensor pair A12 overlapping the sensor pairs A23, A34 and A45 accordingly. One effect of this is that the sensor distance within the sensor pairs A12, A34 and A56 is equal to the distance of the rolling radius r=2.5 that is ideal for the signal quality. However, the remaining sensor pairs A23 and A45 still have a relatively small distance of 1.5 mm. The difference signal of these two sensor pairs thus still has a somewhat reduced amplitude.

The solution according to FIG. 5C arranges the sensors having an even ordinal number A2, A4 in such a way that they are each 0.5 mm away from the ideal distance r=2.5 mm from the two sensors having an odd ordinal number A1, A3, A5, with which they form a sensor pair (A2 with A1 to form A12, with A3 to form A23; A4 with A3 to form A34, with A5 to form A45). Thus, a compromise is created between the maximization of the individual amplitudes of the sensor signals and a continuous sensitivity along the tuple, i.e., between the layouts of the tuples according to FIGS. 5a and 5b, that as high as possible.

Until now, the other optimization goal of reducing the sensitivity of the sensor signals to the disturbance variables has not yet been taken into account. For an ideal compensation, the sensors of a sensor pair would have to lie on top of one another, which would, however, lead to an amplitude of 0 in the differential signals and thus is useless.

The solution according to the exemplary embodiment according to FIG. 5d provides a solution. In this case, the sensors of the tuple A (the same applies to tuple B) having an odd ordinal number A1, A3, A5 are each split into sensor portions a, b, wherein these are then arranged in a section at the ideal distance of r=2.5 mm around their pair-forming sensor having an even ordinal number. Thus, for example, the sensor A2 is 3 mm away from the sensor portion A1*a* (d1*a*2) and 2 mm away from the sensor portion A1*b* (d21*b*). As a consequence, the relevant sensor portion b positioned in the rolling direction x is spaced apart from its associated sensor portion a by the rolling or rolling body diameter 5 mm (2 r). In the case of a constant load on the rolling bodies, which is generally at least similar between adjacent rolling bodies 6, the measured sensor signal of the two sensor portions is thus the same. However, the pair-forming sensors having an even ordinal number A2, A4, A6, i.e., for example, sensor A2 for the sensors A1 (A1*a*1*b*), A3 (A3*a*3*b*) and A5 (A5*a*5*b*), are now enclosed by these sensors A1, A3, A5. If a disturbance variable having a gradient which is continuously positive or negative in the sensor region is now present in the rolling direction x along the rolling path insert 12, which can be assumed in the case of temperature change and bending of the rolling path insert 12, the disturbance variable acts similarly on both sensors of a sensor pair. If the disturbance variable is present without a gradient, the compensation functions ideally anyway.

The ordinal numbers 1, 2, 3, 4, 5, 6 are a result of the pair formation and, due to the overlap of the sensor pairs, do not represent the geometric structural sequence of the sensors 22 in the rolling direction x. Rather, the pair formation is carried out in the evaluation device 26 by the evaluation of the sensor signals in pairs that takes place therein. The pair formation can be established with the assistance of hardware or software.

Figure 7:
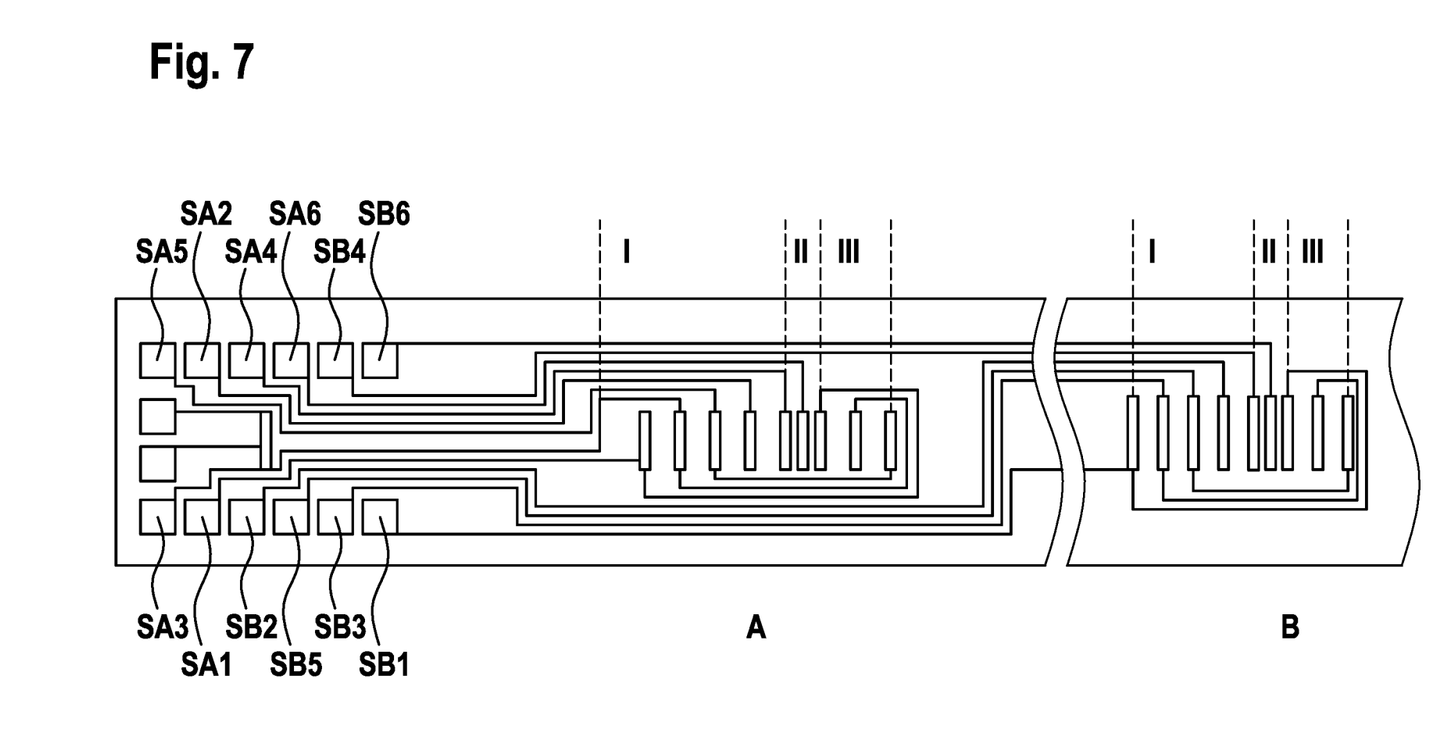
FIG. 7 is a detailed view of the sensor tuple of the sensor device according to FIG. 6.

FIG. 7 shows the wiring of the sensors of the tuples A, B with their signal contacts SA1-6 and SB1-6 in a detailed view, wherein the distance L is shown shortened. The configuration of the tuples A, B according to the exemplary embodiment according to FIG. 5*d* can be clearly seen.

The invention claimed is:

1. A sensor device for a rolling path insert of a track guide, the sensor device comprising:
 a plurality of sensors;
 at least one tuple, extending in a rolling direction, of the plurality of sensors; and
 an evaluation device to which each sensor of the plurality of sensors is signal-connected or is configured to be signal-connected, the evaluation device configured to determine respective difference signals from sensor signals of each sensor pair of a plurality of sensor pairs of the at least one tuple,
 wherein the sensor device is configured to be loaded by rolling bodies and is pressure-sensitive, and
 wherein at least two sensor pairs of the plurality of sensor pairs overlap one another in the rolling direction.

2. The sensor device according to claim 1, wherein, in relation to the rolling direction, a linear distance between sensors of each respective sensor pair of the tuple is greater than an overall length of the tuple divided by a number of the plurality of sensor pairs.

3. The sensor device according to claim 2, wherein the linear distance between the sensors lies in a range encompassing a rolling body radius, in a range encompassing a rolling body diameter, or a rolling distance.

4. The sensor device according to claim 2, wherein the overall length of the tuple is equal to or greater than a rolling body diameter or a rolling distance.

5. The sensor device according to claim 1, wherein at least one of the sensors of at least one of the plurality of sensor pairs of the tuple is divided into sensor portions which are spaced apart from one another in the rolling direction.

6. The sensor device according to claim 5, wherein the sensor portions of the divided sensor are spaced apart in the rolling direction by greater than one or equal to one rolling body diameter or rolling distance.

7. The sensor device according to claim 5, wherein another of the sensors of the sensor pair is arranged together with the divided sensor between the sensor portions of the divided sensor in relation to the rolling direction.

8. The sensor device according to claim 1, wherein at least part of the plurality of sensors and/or sensor portions of the plurality of sensors are arranged distributed equidistantly over the tuple along the rolling direction.

9. The sensor device according to claim 1, wherein:
 a first sensor pair of the plurality of sensor pairs is formed at least by a first sensor or sensor portion and a second sensor spaced apart from the first sensor or sensor portion in the rolling direction,
 a second sensor pair of the sensor pairs is formed from the second sensor and a third sensor or sensor portion spaced apart in a direction opposite the rolling direction, and
 the evaluation device is configured to determine the respective difference signals including a first difference signal based on sensor signals from the first sensor or sensor portion and the second sensor, and a second difference signal based on sensor signals from the second sensor and the third sensor or sensor portion.

10. The sensor device according to claim 1, wherein the plurality of sensor pairs are formed continuously and alternately in and counter to the rolling direction.

11. A sensor device for a rolling path insert of a track guide, the sensor device comprising:
 a plurality of sensors;
 at least one tuple, extending in a rolling direction, of the plurality of sensors;
 an evaluation device to which each sensor of the plurality of sensors is signal-connected or is configured to be signal-connected, the evaluation device configured to determine a relevant difference from sensor signals of sensor pairs of the at least one tuple,
 wherein the sensor device is configured to be loaded by rolling bodies and is pressure-sensitive,
 wherein at least two of the sensor pairs overlap in the rolling direction, and
 wherein the sensors or sensor portions of the tuple that have an odd ordinal number are each arranged offset in succession by a distance in relation to the rolling direction, said distance lying in a range around a quotient which is calculated from a rolling body diameter or rolling distance based on a number of sensor pairs.

12. The sensor device according to claim 11, wherein the sensor having an even ordinal number of the sensor pair formed in the rolling direction is at a distance from the sensor or sensor portion having the odd ordinal number of the associated sensor pair, the distance including a sum of a rolling body radius and a quotient calculated from the rolling body radius and a number of sensor pairs.

13. The sensor device according to claim 11, wherein the sensor or sensor portion having an odd ordinal number of the sensor pair formed counter to the rolling direction is at a distance from the sensor having an even ordinal number of the sensor pair formed in the rolling direction, the distance including a difference of a rolling body radius and the quotient.

14. A rolling path insert for a track guide, comprising: the sensor device according to claim 1.

15. A guide carriage or guide rail for a track guide, comprising:
the sensor device according to claim 1;
at least one rolling path insert; and
the rolling bodies, which are arranged on the at least one rolling path insert between the guide carriage and the guide rail and configured to roll on the at least one rolling path insert.

16. A track guide comprising:
an extending guide rail;
a guide carriage which is roller-mounted on the extending guide rail and movable in an extension direction;
at least one rolling path insert;
rolling bodies arranged on the at least one rolling path insert between the guide carriage and the guide rail and configured to roll on the at least one rolling path insert; and
a sensor device comprising:
a plurality of sensors;
at least one tuple, extending in a rolling direction, of the plurality of sensors; and
an evaluation device to which each sensor of the plurality of sensors is signal-connected or is configured to be signal-connected, the evaluation device configured to determine respective difference signals from sensor signals of each sensor pair of a plurality of sensor pairs of the at least one tuple,
wherein the sensor device is configured to be loaded by the rolling bodies and is pressure-sensitive, and
wherein at least two sensor pairs of the plurality of sensor pairs overlap one another in the rolling direction.

17. The track guide according to claim 16, wherein the track guide is a linear guide.

* * * * *